United States Patent [19]

Matsuo

[11] Patent Number: 4,962,434
[45] Date of Patent: Oct. 9, 1990

[54] REPRODUCING DEVICE FOR VIDEO SIGNAL

[75] Inventor: Yasutoshi Matsuo, Kawasaki, Japan

[73] Assignee: Victor Company of Japan, Ltd., Yokohama, Japan

[21] Appl. No.: 430,109

[22] Filed: Nov. 1, 1989

Related U.S. Application Data

[63] Continuation of Ser. No. 75,331, Jul. 20, 1987, abandoned.

[30] Foreign Application Priority Data

Jul. 21, 1986 [JP] Japan ................... 61-171392
Jul. 21, 1986 [JP] Japan ................... 61-171393

[51] Int. Cl.$^5$ .............................................. H04N 5/91
[52] U.S. Cl. ...................................... 358/340; 358/167
[58] Field of Search ............... 358/36, 167, 327, 336, 358/340; 369/54

[56] References Cited

U.S. PATENT DOCUMENTS 4,607,285 8/1986 Hirota et al. ................... 358/340 X

FOREIGN PATENT DOCUMENTS

0133049 2/1985 European Pat. Off. .
0187540 2/1985 European Pat. Off. .
2157528 10/1985 United Kingdom .

Primary Examiner—James B. Mullins
Attorney, Agent, or Firm—Michael N. Meller

[57] ABSTRACT

A recording and reproducing device for a video signal comprises a recording circuit for changing an input video signal to a recording video signal, and a reproducing circuit for changing a reproduced video signal to an output video signal. Particularly, the reproducing circuit of this device includes a first high-pass filter having a time constant Ts, a first limiter for limiting the amplitude of the output signal of the first high-pass filter, and a first coefficient multiplier circuit for multiplying an output signal of the first limiter by a first coefficient K. The reproducing circuit further includes a first computation circuit for summing an output signal of the first coefficient multiplier circuit and the output video signal to deliver a signal indicative of the summed result to the first high-pass filter, a second coefficient multiplier circuit for multiplying the output signal of the first limiter by a second coefficient X, and a second computation circuit for subtracting the output signal of the second coefficient multiplier circuit from the reproduced video signal to output the output video signal. In this circuit, when a time constant corresponding to a frequency at which the noise reduction effect becomes effective is assumed as T, the time constant Ts is set within a range expressed as $T>Ts>T/(X+1)$. Thus, this device can satisfactorily cope with both the random noise and the impulse noise even when the emphasis quantity is set to a large value.

19 Claims, 5 Drawing Sheets

FIG.11C $c_1$ $T \fallingdotseq T_s$ $T = \frac{1}{1+K} T_s$

FIG.13C $c_3$ — $T \doteq T_S$, $T = \frac{1+X}{1+K} T_S$

FIG.13D $d_3$ — LIMITER LEVEL

REPRODUCING DEVICE FOR VIDEO SIGNAL

This application is a continuation of application Ser. No. 75,331, filed 7/20/87, abandoned.

BACKGROUND OF THE INVENTION

The present invention relates to a recording and reproducing device for a video signal, and more particularly to a device capable of reducing noise components in a recording or reproducing system of, e.g., VTR.

In the reproducing system of the conventional recording and reproducing device for video signal, various de-emphasis circuits have been devised in order to reduce noises included in a reproduced video signal. As an example of conventional de-emphasis circuits, a circuit comprising a high-pass filter, a limiter, a coefficient multiplier, and a subtracter which are connected in series is proposed. According to this circuit, a reproduced video signal undergoes amplitude limitation by the limiter after subjected to filtering by the high-pass filter. After the signal thus processed is multiplied by a predetermined coefficient by the coefficient multiplier, it is subtracted from the input reproduced video signal and then is output therefrom. As another example of conventional de-emphasis circuits, a circuit of the feedback type is also proposed. According to this circuit, a signal which has been multiplied by the coefficient multiplier is fed back to the high-pass filter as an input signal.

The reproduced video signal includes a random noise of no periodicity, and an impulse noise having an extremely short duration. The first-mentioned de-emphasis circuit can effectively reduce the impulse noise, but fails to effectively reduce the random noise. In contrast, the last-mentioned de-emphasis circuit of the feedback type can effectively reduce the random noise, but fails to effectively reduce the impulse noise.

As just described above, a circuit which can satisfactorily cope with both the random noise and the impulse noise has not been proposed in the art. The adverse effect, namely the random or the impulse noise becomes more conspicuous as the amount of the emphasis is intended to increase.

SUMMARY OF THE INVENTION

An object of the present invention is to provide a recording and reproducing for a video signal which can satisfactorily cope with both the random noise and the impulse noise even when the emphasis quantity is set to a large value.

The above object is accomplished by the provision of a recording and reproducing for a video signal comprising a recording circuit for changing an input video signal to generate a recording video signal, and a reproducing circuit for changing a reproduced video signal to generate an output video signal, the reproducing circuit comprising: a first high-pass filter having a time constant Ts; a first limiter for limiting the amplitude of an output signal of the first high-pass filter; a first coefficient multiplier circuit for multiplying an output signal of the first limiter by a first coefficient K; a first computation circuit for summing an output signal of the first coefficient multiplier circuit and the output video signal to deliver a signal indicative of the summed result to the first high-pass filter; a second coefficient multiplier circuit for multiplying the output signal of the first limiter by a second coefficient X; and a second computation circuit for subtracting the output signal of the second coefficient multiplier circuit from the reproduced video signal to output the output video signal, wherein when a time constant corresponding to a frequency at which the noise reduction effect becomes effective is assumed as T, the above-mentioned time constant Ts is set within a range expressed below:

$$T > Ts > T/(X+1).$$

BRIEF DESCRIPTION OF THE DRAWINGS

FIGS. 11 (A–E) and 12 (A–E) are respectively show signal waveforms for explanation of the operation of the recording system of the device shown in FIG. 9A.

FIGS. 13 (A–E) and 14 (A–E) show signal waveforms for the explanation of the operation of the reproducing system of the device shown in FIG. 9B.

FIGS. 15 (AB) to 17, 16 (AB), 17 (AB) are circuit diagrams showing second to fourth embodiment of a device according to the present invention, respectively;

DETAILED DESCRIPTION OF THE INVENTION

Prior to the detailed description of the present invention, actual examples of conventional recording and reproducing device for a video signal will be first explained.

Figure 1:
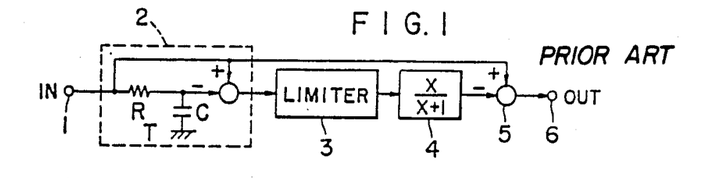
FIG. 1 is a circuit diagram showing an example of conventional circuits.
Figures 2A, 2B:
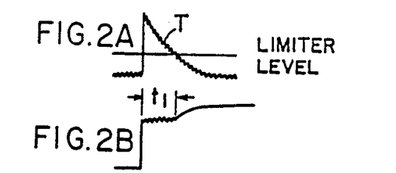
FIGS. 2A, 2B and 3 show signal waveforms and the transfer characteristic of the circuit shown in FIG. 1, respectively.
Figure 3:
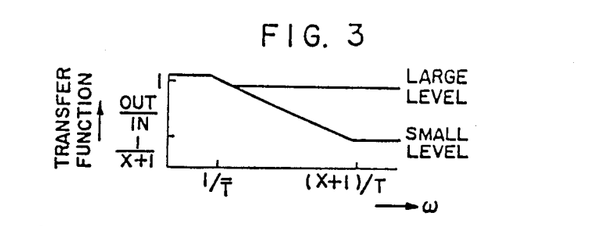

FIG. 1 is a circuit diagram showing an example of a de-emphasis circuit of the reproducing system of the conventional device. A video signal incoming to an input terminal 1 is delivered to a limiter 3 via a high-pass filter 2, at which the video signal undergoes amplitude limitation and is thereby changed to a signal as shown in FIG. 2A. The signal thus obtained is delivered to a subtracter 5 via a coefficient multiplier circuit 4, at which it is subtracted from the original video signal. Thus, a signal as shown in FIG. 2B (having a relatively large noise remaining time $t_1$) is obtained and is then taken out from an output termial 6. The transfer characteristics at the time of large and small levels of the entirety of this circuit are as indicated by FIG. 3.

Figure 4:
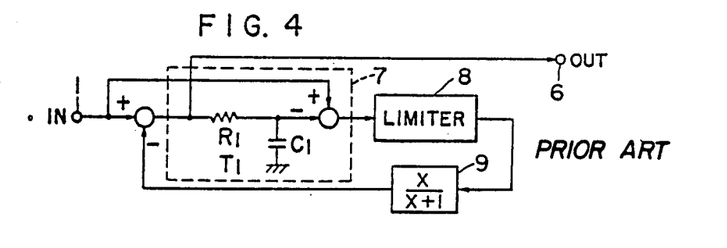
FIG. 4 is a circuit diagram showing another example of conventional circuits.
Figures 5A, 5B:
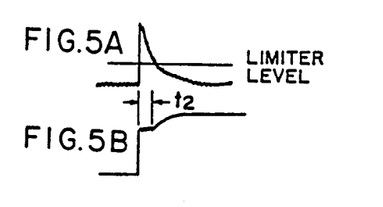
FIGS. 5A, 5B and 6 show signal waveforms and the transfer characteristic of the circuit shown in FIG. 4, respectively.
Figure 6:
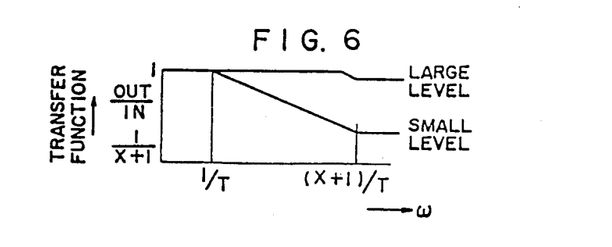

FIG. 4 is a circuit diagram showing another example of a conventional de-emphasis circuit of the feedback type. A video signal incoming to the input terminal 1 is delivered to a limiter 8 via a high-pass filter 7, at which the video signal is subjected to amplitude limitation and is thereby changed to a signal as shown in FIG. 5A. The signal thus obtained is fed back to a subtracter 10 via a coefficient multiplier circuit 9, at which it is subtracted from the original video signal. Thus, a signal as shown in FIG. 5B (having a relatively short noise remaining time $t_2$) is obtained and is then taken out from the output terminal 6. The transfer characteristics at the time of large and small levels of the entirety of this circuit are as indicated by FIG. 6.

Figures 7A, 7B, 7C:
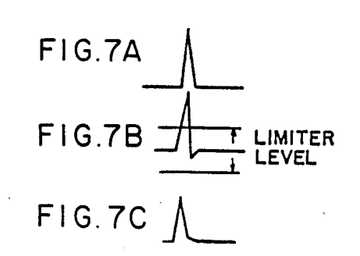
FIGS. 7A, 7B, 7C and 8A, 8B, 8C show signal waveforms of the circuits shown in FIGS. 1 and 4, respectively.
Figures 8A, 8B, 8C:
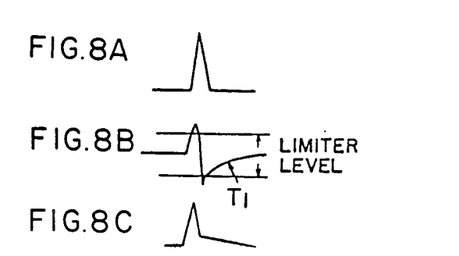

As previously mentioned, with the conventional circuit shown in FIG. 1, in the case where a noise impulse (FIG. 7A) is incoming, the limiter 3 produces an output as shown in FIG. 7B. Thus, a signal as shown in FIG. 7C is taken out from the output terminal 6. On the other hand, with the conventional circuit shown in FIG. 4, in the case where a noise impulse (FIG. 8(A)) is incoming, the limiter 8 produces an output as shown in FIG. 8B (the gradual rise after the acute fall is due to the time constant T of the high-pass filter 7). Thus, a signal as shown in FIG. 8C is taken out from the output terminal 6.

For general random noises, the conventional circuit shown in FIG. 4 is preferable to the conventional circuit shown in FIG. 1 on the ground that the remaining noise duration ($t_2$) after the rising edge of the unit step is small as shown in FIGS. 2B and 5B. For the impulse noises, however, the conventional circuit shown in FIG. 1 is preferable to the conventional circuit shown in FIG. 4 on the ground of that so called "streaking noise" produced in the conventional circuit shown in FIG. 4 is not produced as shown in FIGS. 7C and 8C.

As just described above, the de-emphasis circuits shown in FIGS. 1 and 4 can reduce either the impulse noise or the random noise, but fail to effectively reduce both the impulse noise and the random noise.

In view of this, the present invention contemplates provision of an improved recording and reproducing device for a video signal which can overcome the drawbacks of the prior art devices.

Figure 9A:
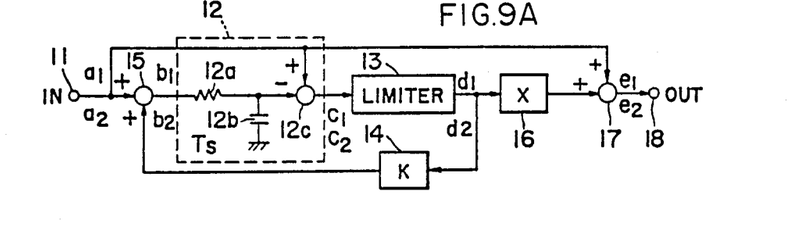
FIGS. 9A and 9B are circuit diagram showing a first embodiment of a device according to the present invention.
Figure 9B:
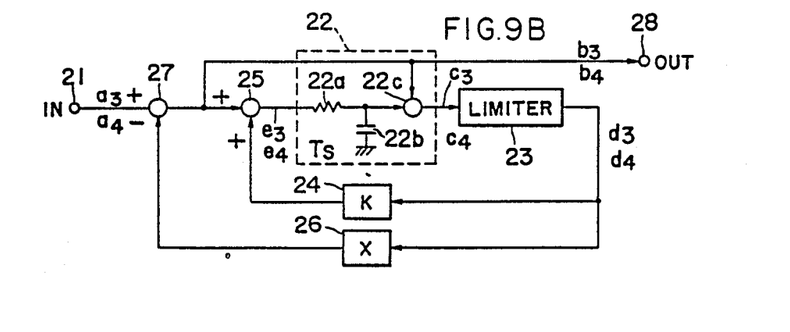

FIGS. 9A and 9B are circuit diagrams showing a first embodiment of an emphasis circuit of the recording system and a de-emphasis circuit for the reproducing system provided in a recording and reproducing device for a video signal according to the present invention, respectively.

In the emphasis circuit shown in FIG. 9A, a terminal 11 to which a video signal is inputted is connected to a high-pass filter 12 through a summer or summing circuit 15. The high-pass filter 12 comprises a resistor 12a one end of which is connected to its input terminal, the other end of the resistor 12a is grounded via the capacitor 12b, and a subtracter 12c connected to the intermediate junction of the resistor 12a and the capacitor 12b. The time constant Ts of the high-pass filter 12 is given by the product of the resistance value R of the resistor 12a and the capacity value C of the capacitor 12b. The high-pass filter 12 is connected to a limiter 13 for limiting the amplitude of a signal. The limiter 13 is connected back to the above-mentioned summer 15 through a coefficient multiplier circuit 14 for multiplication of a coefficient K. The summer 15 sums the signal fed back and the video signal input to the terminal 11 to output a signal indicative of the summed result to the high-pass filter 12. The limiter 13 is further connected to a terminal 18, from which the video signal is output, through a coefficient multiplier circuit 16 for multiplication of a coefficient X and another summer 17. The summer 17 sums the output signal of the coefficient multiplier circuit 16 and the video signal input to the terminal 11.

Figure 10A:
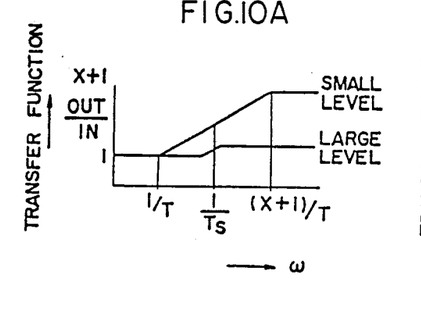
FIG. 10A and 10B show the transfer characteristics of the circuit shown in FIG. 9A and 9B respectively.

When a time constant corresponding to a frequency at which the noise reduction effect becomes effective is assumed as T, the time constant Ts of the high-pass filter 12 is set as follows:

$$T > Ts > T/(X+1),\qquad(1)$$

Where X is a degree of emphasis of the video signal referred in ratio to a non-emphasized level thereof, namely a level below the frequency 1/T shown in FIG. 10. Thus, the transfer characteristics at the time of large and small levels of the entirety of this emphasis circuit are as indicated by FIG. 10A.

The operation of the emphasis circuit shown in FIG. 9(A) will be now described.

Figure 11A:
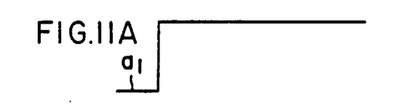
Figure 11B:
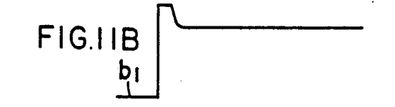
Figures 11C, 11D:
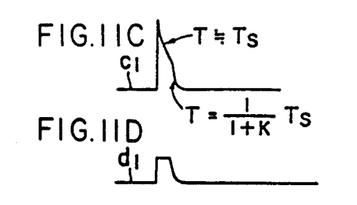
Figure 11E:
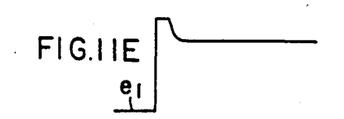

A video signal $a_1$ (FIG. 11A) incoming to the terminal 11 is changed to a signal $c_1$ (FIG. 11C) by the high-pass filter 12. Application of amplitude limitation to the signal $c_1$ by the limiter 13 results in a signal $d_1$ (FIG. 11D). The signal $d_1$ is delivered to the summer 15 via the coefficient multiplier circuit 14 at which the coefficient K is set. Thus, a signal $b_1$ (FIG. 11B) is obtained. Further, the signal $d_1$ is delivered to the summer 17 via the coefficient multiplier circuit 16 at which the coefficient X is set, so that a signal $e_1$ (FIG. 11E) is obtained. The signal $e_1$ thus obtained is taken out from the output terminal 18. As shown in FIG. 11C, the time constant is expressed as $T \approx Ts$ immediately after fall of the waveform. The times constant at time subsequent thereto is expressed as $T = \{1/(1+K)\}Ts$.

Figure 12A:
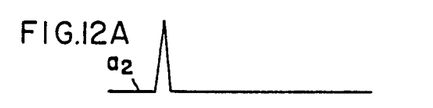
Figure 12B:
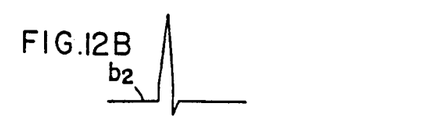
Figures 12C, 12D:
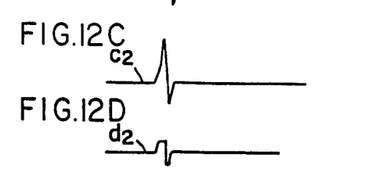

On the other hand, when an impulse noise $a_2$ (FIG. 12A) is incoming to the terminal 11, it is changed to a signal $c_2$ (FIG. 12C) by the high-pass filter 12. Application of amplitude limitation to the signal $c_2$ by the limiter 13 results in a signal $d_2$ (FIG. 12D). The signal $d_2$ is delivered to the summer 15 via the coefficient multiplier circuit 14. Thus, a signal $b_2$ (FIG. 12B) is obtained. Further, the signal $d_2$ is delivered to the summer 17 via the coefficient multiplier circuit 16, so that a signal $e_2$ (FIG. 12E) is obtained. The signal $e_2$ thus obtained is taken out from the output terminal 18.

Figure 12E:
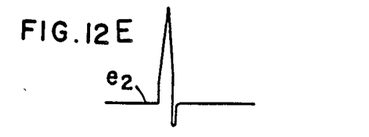

In this instance, since the time constant Ts of the high-pass filter 12 is set so as to satisfy $T > Ts > T/(X+1)$, it is possible to sharpen the waveform of the output $c_2$ of the limiter 13 after it has fallen, resulting in no possibility that so called "streaking noise" occurs as shown in FIG. 12E.

In the de-emphasis circuit shown in FIG. 9B, a terminal 21, to which a reproduced video signal is inputted, is connected to a high-pass filter 22 through a subtracter 27 and a summer 25. The high-pass filter 22 comprises a resistor 22a one end of which is connected to its input terminal, the other end of the resistor 22a being grounded via a capacitor 22b, and a subtracter 22c connected to the intermediate junction of the resistor 22a and the capacitor 22b. The time constant Ts of the high-pass filter 22 is given by the product of the resistance value R of the resistor 22a and the capacity value C of the capacitor 22b. The high-pass filter 22 is connected to a limiter 23 for limiting the amplitude of a signal. The limiter 23 is connected to a summer 25 through a coefficient multiplier circuit 24 for multiplication of a coefficient K, and is also connected to a subtracter 27 through a coefficient multiplier circuit 26 for multiplication of of coefficient X. The subtracter 27 subtracts the output signal of the coefficient multiplier circuit 26 from the reproduced video signal input from the terminal 21 to output a difference signal to a terminal 28. The summer 25 sums the output video signal and the output signal from the coefficient multiplier circuit 24 to output a signal indicative of the summed result to the high-pass filter 22.

When a time constant corresponding to a frequency at which the noise reduction effect becomes effective is assumed as T, the time constant Ts of the high-pass filter is set as follows:

$$T > Ts > T/(X+1) \quad (1)$$

Figure 10B:
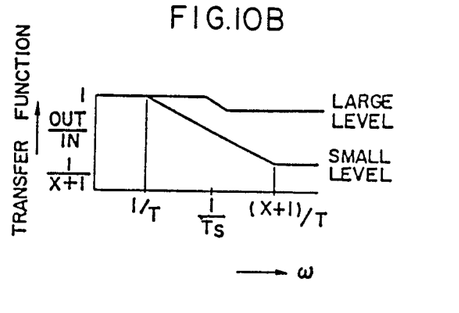

Thus, the transfer characteristics at the time of large and small levels of the entirety of this de-emphasis circuit are as indicated by FIG. 10B.

Assuming now that the time constant Ts is expressed as $Ts = \{(K+1)/(X+1)\}T$ in the circuits shown in FIGS. 9A and 9B, the range of the coefficient K of the coefficient multiplier circuits 14 and 24 are set to $0 < K < X$ so as to satisfy the above equation (1). In this instance, the transfer function of the de-emphasis circuit shown in FIG. 9B is expressed by the following equation:

$$\frac{OUT}{IN} = \frac{1 + \{1/(1 + K)\}Ts}{1 + \{(1 + X)/(1 + K)\}Ts}$$

On the other hand, the transfer function of the emphasis circuit shown in FIG. 9A is expressed by the following equation, which is defined as reciprocal of the above equation:

$$\frac{OUT}{IN} = \frac{1 + \{(1 + X)/(1 + K)\}Ts}{1 + \{1/(1 + K)\}Ts}$$

The operation of the de-emphasis circuit shown in FIG. 9(B) will be now described.

Figure 13A:
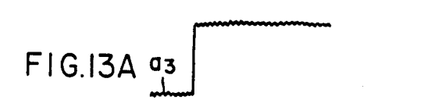
Figure 13B:
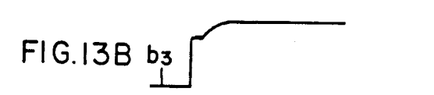
Figure 13C:
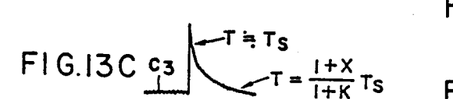
Figure 13D:
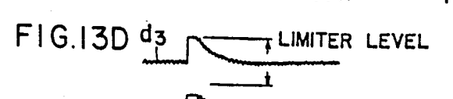
Figure 13E:
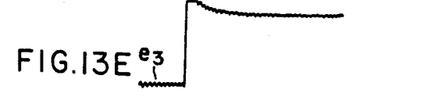

A video signal a3 (FIG. 13A) incoming to the terminal 21 is changed to a signal c3 (FIG. 13A) by the high-pass filter 22. Application of amplitude limitation to the signal a3 by the limiter 23 results in a signal d3 (FIG. 13D). The signal d3 is delivered to the summer 25 via the coefficient multiplier circuit 24 at which the coefficient K is set. Thus, a signal e3 (FIG. 13(E)) is obtained. Further, the signal d3 is delivered to a subtracter 27 via the coefficient multiplier circuit 26 at which the coefficient X is set. Thus, a signal b3 (FIG. 13B) is obtained. The signal b3 thus obtained is taken out from the output terminal 28. As shown in FIG. 13C, the time constant immediately after fall of the waveform is expressed as $T = Ts$, and the time constant at time subsequent thereto is expressed as $T = \{(1+X)/(1+K)\}Ts$.

Since the de-emphasis circuit of the feedback type is employed in the embodiment of the present invention, the remaining time of the random noise is small as in the conventional circuit shown in FIG. 4.

Figure 14A:
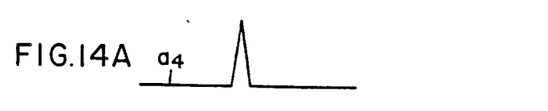
Figure 14B:
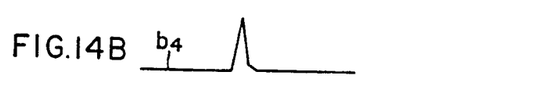
Figure 14C:
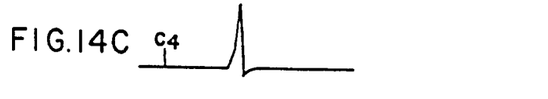
Figure 14D:
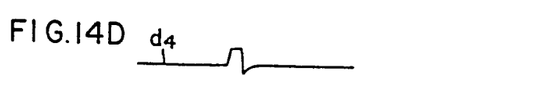
Figure 14E:
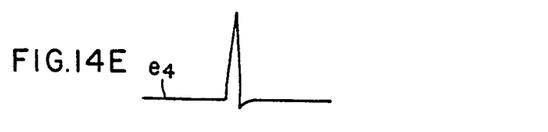

On the other hand, when an impulse noise a4 (FIG. 14A) is incoming to the terminal 21, the impulse noise a4 is changed to a signal c4 (FIG. 14C) by the high-pass filter 22. Application of amplitude limitation to the signal c4 by the limiter 23 results in a signal d4 (FIG. 14D). The signal d4 is delivered to the summer 25 via the coefficient multiplier circuit 24. Thus, a signal e4 (FIG. 14E) is obtained. Further, the signal d4 is delivered to the subtracter 27 via the coefficient multiplier circuit 26. Thus, a signal b4 (FIG. 14B) is obtained. The signal b4 thus obtained is taken out from the output terminal 28. In this instance, since the time constant Ts of the high-pass filter is set so as to satisfy $T > Ts > T/(X+1)$, the waveform of the output d4 (FIG. 14D) of the limiter 23 after it has fallen can be improved as compared to the conventional circuit shown in FIG. 4. Thus, as shown in FIG. 14B, there is little possibility that so called "streaking noise" as shown in FIG. 8C occurs.

Figure 15A:
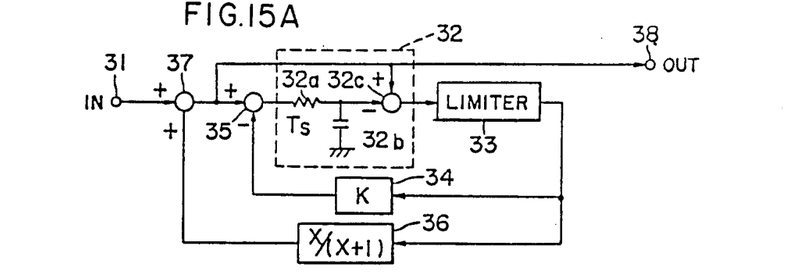
Figure 15B:
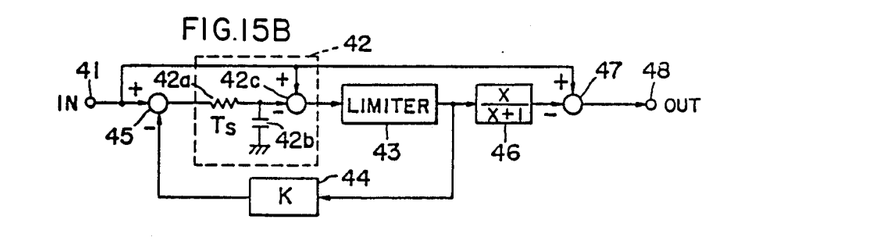

FIGS. 15A and 15B show circuit diagrams showing a second embodiment of an emphasis circuit of the recording system and a de-emphasis circuit of the reproducing system of a recording and reproducing device according to the present invention, respectively.

In the emphasis circuit shown in FIG. 15A, a terminal 31 to which a video signal is inputted is connected to a high-pass filter 32 through a summer 37 and a subtracter 35. The high-pass filter 32 comprises a resistor 32a one end of which is connected to its input terminal, the other end of which is grounded via a capacitor 32b, and a subtracter 32c connected to the intermediate junction of the resistor 32a and the capacitor 32b. The time constant Ts of the high-pass filter 32 is given by the product of the resistance value R of the resistor 32a and the capacity value C of the capacitor 32b. The high-pass filter 32 is connected to a limiter 33 for limiting the amplitude of a signal. The limiter 33 is connected to the subtracter 35 through a coefficient multiplier circuit 34 for multiplication of a coefficient K, and is also connected to the summer 37 through a coefficient multiplier circuit 36 for multiplication of a coefficient $X/(X+1)$. The summer 37 subtracts the output signal of the coefficient multiplier circuit 36 from the video signal input from the terminal 31 to output a difference signal to a terminal 38. The subtracter 35 provides the difference the output video signal and the output signal from the coefficient multiplier circuit 34 to output a signal indicative of the subtracted result to the high-pass filter 32.

Also in the circuit of this embodiment, the time constant Ts of the high-pass filter 32 is set so as to satisfy the above-mentioned equation (1) in the same manner as in the first embodiment, and the transfer characteristic of the entirety of the circuit is as indicated by FIG. 10A.

In operation, a video signal incoming to the terminal 31 is delivered to the limiter 33 via the high-pass filer 32, at which the video signal is subjected to amplitude limitation. The signal thus processed is delivered to the subtracter 35 via the coefficient multiplier circuit 34 at which the coefficient K is set. The output of the limiter 33 is taken out from the terminal 38 via the coefficient multiplier circuit 36 at which the coefficient $X/(X+1)$ is set and via the summer 37.

In the de-emphasis circuit shown in FIG. 15B, a terminal 41 to which a video signal is inputted is connected to a high-pass filter 42 through a subtracter 45. The high-pass filter 42 comprises a resistor 42a one end of which is connected in series with its input terminal, and the other end of which is grounded via a capacitor 42b, and a subtracter 42c connected to the intermediate junction of the resistor 42a and the capacitor 42b. The time constant Ts of the high-pass filter 42 is given by the product of the resistance value R of the resistor 42a and the capacity value C of the capacitor 42b. The high-pass filter 42 is connected to a limiter 43 for limiting the amplitude of a signal. The limiter 43 is connected to the subtracter 45 through a coefficient multiplier circuit 44 for multiplication of a coefficient K. The subtracter 45 provides the difference of the signal fed back and the video signal input to the terminal 41 to output a signal indicative of the subtracted result to the high-pass filter 42. The limiter 43 is connected to a terminal 48 through a coefficient multiplier circuit 46 for multiplication of a coefficient X/(X+1) and a subtracter 47. The subtracter 47 provides difference of the output signal of the coefficient multiplier circuit 46 and the video signal input to the terminal 41.

Also in the circuit of this embodiment, the time constant Ts of the high-pass filter 42 is set so as to satisfy the above-mentioned equation (1), and the transfer characteristic of the entirety of the circuit is determined as shown in FIG. 10B which is complementary to the characteristics shown in FIG. 10B.

In operation, a video signal incoming to the terminal 41 is delivered to the limiter 43 via the high-pass filter 42, at which the video signal is subjected to amplitude limitation. The signal thus processed is delivered to the subtracter 45 via the coefficient multiplier circuit 44 at which the coefficient K is set. The output of the limiter 43 is taken out from the output terminal 48 via the coefficient multiplier circuit 46 at which the coefficient X/(X+1) is set and via the subtracter 47.

Assuming now that the time constant Ts is expressed as $Ts=(1-K)T$ in the circuits shown in FIGS. 15A and 15B, the range of the coefficient K of the coefficient multiplier circuit 44 at which the coefficient K is set to $$0 < K < \frac{X}{X+1}$$

in order to satisfy the above-mentioned equation (1). In this instance, the transfer function of the circuit shown in FIG. 15B is as follows:

$$\frac{OUT}{IN} = \frac{1 + \{1/(1-K)(X+1)\}Ts}{1 + \{1/(1-K)\}Ts}.$$

On the other hand, the transfer function of the circuit shown in FIG. 15A is defined as the reciprocal of the above equation, which is expressed as follows:

$$\frac{OUT}{IN} = \frac{1 + \{1/(1-K)\}Ts}{1 + \{1/(1-K)(X+1)\}Ts}.$$

Figure 16A:
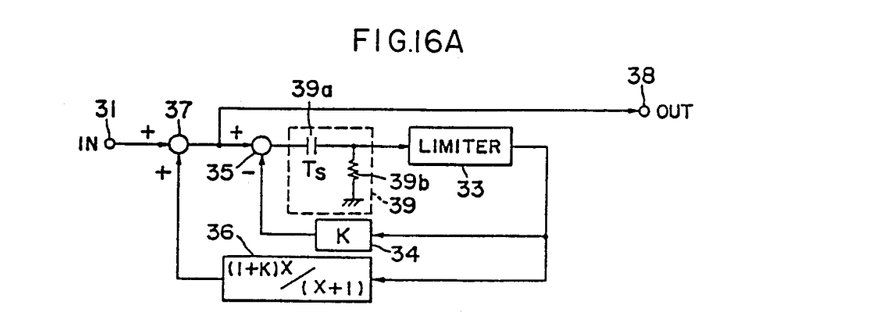
Figure 16B:
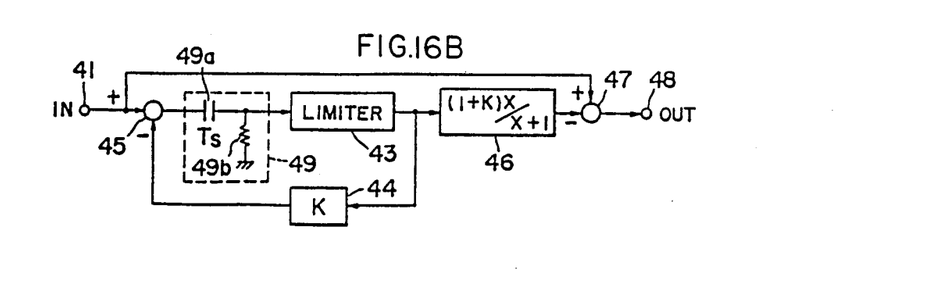

FIGS. 16A and 16B are circuit diagrams showing a third embodiment of an emphasis circuit of the recording system and a de-emphasis circuit of the reproducing system of a recording and reproducing device according to the present invention, respectively. The circuits shown in FIGS. 16A and 16B are characterized in that the high-pass filters 32 and 42 shown in FIGS. 15A and 15B are respectively replaced by high-pass filters 39 and 49 and each coefficient of the coefficient multiplier circuits 36 and 46 is changed to $(1+K)X/(X+1)$. The high-pass filter 39 comprises a capacitor 39a connected in series with its input terminal, and resistor 39b bridging the capacitor 39a to the ground. The high-pass filter 49 has a circuit configuration similar to the high-pass filter 39, which comprises a capacitor 49a and a resistor 49b. Assuming now that the time constant Ts of the high-pass filters 39 and 49 is set at a value expressed as $Ts=\{1/(1+K)\}T$, the range of the coefficient K of the coefficient multiplier circuits 34 and 44 is set to $0 < K < X$ in order to satisfy the above-mentioned equation (1). The transfer function of the circuit shown in FIG. 16B is expressed as follows:

$$\frac{OUT}{IN} = \frac{1 + \{(K+1)/(X+1)\}Ts}{1 + (1+K)Ts}.$$

On the other hand, the transfer function of the circuit shown in FIG. 16A is defined as the reciprocal of the above equation, which is expressed as follows:

$$\frac{OUT}{IN} = \frac{1 + (1+K)Ts}{1 + \{(K+1)/(X+1)\}Ts}.$$

Figure 17A:
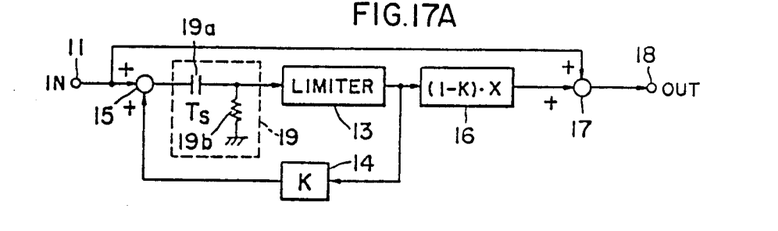
Figure 17B:
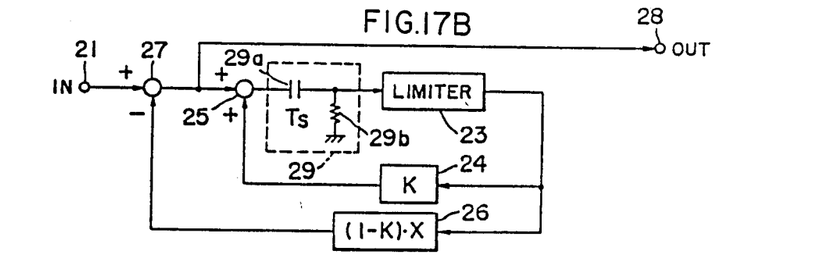

FIGS. 17A and 17B are circuit diagrams showing a fourth embodiment of an emphasis circuit of the recording system and a de-emphasis circuit of the reproducing system of a recording and reproducing device according to the present invention. This embodiment is characterized in that the high-pass filters 12 and 22 of the first embodiment shown in FIG. 9A and 9B are respectively replaced with high-pass filters 19 and 29, and each coefficient of the coefficient multiplier circuits 16 and 26 is changed to $(1-K)X$. The high-pass filter 19 comprises a capacitor 19a connected in series with its input terminal, and a resistor 19b bridging the capacitor 19a to the ground. The high-pass filter 29 has a circuit configuration similar to the high-pass filter 19, which comprises a capacitor 29a and a resistor 29b.

Assuming now that each time constant Ts of the high-pass filters 19 and 29 is set to $Ts=\{1/(1-K)(X+1)\}T$, the range of the coefficient K of the coefficient multiplier circuits 14 and 24 at which the coefficient K is set is set to $$0 < K < \frac{X}{X+1}$$

in order to satisfy the above-mentioned equation (1). The transfer function at the time of the small amplitude of the circuit shown in FIG. 17B is as follows:

$$\frac{OUT}{IN} = \frac{1 + (1-K)Ts}{1 + \{(1-K)(X+1)\}Ts}.$$

On the other hand, the transfer function of the circuit shown in FIG. 17A is defined as the reciprocal of the above equation, which is expressed as follows:

$$\frac{OUT}{IN} = \frac{1 + \{(1-K)(X+1)\}Ts}{1 + (1-K)Ts}.$$

For home video signal recording and reproducing devices, it is not always required to have a video signal recorded or reproduced with high fidelity as in the fourth embodiments if a above-mentioned first to reproduced image quality is less demanded. In such a case, only for the circuit of the reproducing system, any one of the de-emphasis circuits in the above-mentioned embodiments may be used as a noise canceller circuit. In this instance, in most cases, the coefficient X of the coefficient multiplier circuit 26 in the first embodiment is set to a value nearly equal to infinity. It is preferable that the time constant Ts at this time is set to $T > Ts > T/3$.

Figure 18:
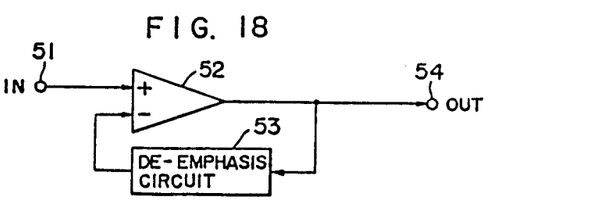
FIG. 18 is a circuit diagram showing a modified embodiment of the invention wherein a reproducing circuit is provided in a feedback path of an operational amplifier.

In addition, as shown in FIG. 18, the circuit of the reproducing system may is constituted with an operational amplifier 52 and a de-emphasis circuit (FIGS. 9B, 15B, 16B and 17B) 53. A terminal 51 to which a reproduced video signal is inputted is connected to the positive input terminal of the operational amplifier 52 and the de-emphasis circuit 53 is connected between the output terminal of the operational amplifier 52 and the negative input terminal thereof. A terminal 54 from which a video signal is outputted is connected to the output terminal of the operational amplifier 52.

Figure 19:
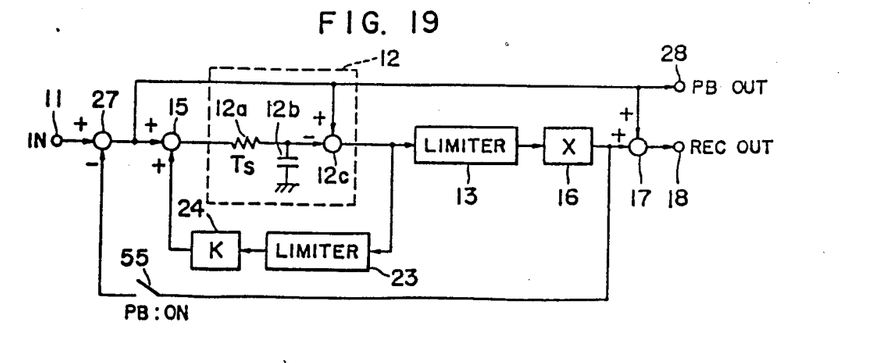
FIG. 19 is a circuit diagram showing a further modified embodiment of the invention wherein the recording and reproducing systems are constituted with a single circuit.

Finally, a fifth embodiment of a circuit of a recording and reproducing device according to the present invention is shown in FIG. 19. This embodiment is characterized in that the circuits of the recording and reproducing systems in the first embodiment are constituted with a single circuit to effect switching between the recording and reproducing systems using a switch. In the recording and reproducing circuit shown in FIG. 19, terminal 11 to which a video signal is inputted is connected to high-pass filter 12 through subtracter 27 and summer 15. The high-pass filter 12 is connected to limiter 13 for limiting the amplitude of a signal. The limiter 13 is connected to the summer 17 through coefficient multiplier circuit 16 for multiplication of coefficient X. Further, the high-pass filter 12 is connected to limiter 23 for limiting the amplitude of a signal. The limiter 23 is connected to coefficient multiplier circuit 24 for multiplication of coefficient K. This coefficient multiplier circuit 24 is connected to the summer 15. The output terminal of the coefficient multiplier circuit 16 is connected to the subtracter 27 through a changeover switch 55.

When the recording operation is conducted using the circuit shown in FIG. 19, the changeover switch 55 is opened. Thus, the circuit in this condition is identical to the circuit shown in FIG. 9A to thereby output a recording output signal from the terminal 18. On the other hand, when the reproducing operation is conducted using this circuit, the changeover switch 55 is closed. Thus, the circuit in this condition is identical to the circuit shown in FIG. 9B to output a reproduced output signal from the terminal 28.

Also in the circuits of the second to fourth embodiments, a changeover switch is used, thereby making it possible to commonly use the circuit components of a portion of the circuits of the recording and reproducing systems with a single circuit.

In accordance with the recording and reproducing device, since the circuit of the feedback type is employed particularly in the circuit of the reproducing system, it is possible to reduce the remaining noise in the duration after the waveform rise with respect to the random noise. Further, since the time constant Ts of the time constant circuit is set to a range expressed as $T > T_s > T/(X+1)$, the impulse noise after the waveform fall in the limiter output can be improved as compared to the same of conventional noise reduction circuit of the feedback type. Thus, so called "streaking noise" does not occur. From an overall point of view, the recording and reproducing device of the invention is advantageous in that it can cope with both the random noise and the impulse noise even if the emphasis quantity is designed to be a large amount, that it can provide high S/N ratio, and that there is no possibility that "streaking noise" occurs also in the recording system even when an impulse noise is incoming, thus making it possible to provide an emphasis effect complementary to the reproducing system.

What is claimed is:

1. A recording and reproducing device for a video signal comprising a recording circuit for changing an input video signal to generate a recording video signal, and a reproducing circuit for changing a reproduced video signal to generate an output video signal, said reproducing circuit comprising:
   a first high-pass filter having a time constant Ts;
   a first limiter for limiting an amplitude of an output signal of said first high-pass filter;
   a first coefficient multiplier circuit for multiplying an output signal of said first limiter by a first coefficient K;
   a first computation circuit for summing an output signal of said first coefficient multiplier circuit and said output video signal to deliver a signal indicative of the summed result to said first high-pass filter;
   a second coefficient multiplier circuit for multiplying an output signal of said first limiter by a second coefficient; and
   a second computation circuit for subtracting an output signal of said second coefficient multiplier circuit from said reproduced video signal to output said output video signal, wherein when a time constant corresponding to a frequency at which the noise reduction effect becomes effective is assumed equal to T, said time constant Ts is set within a range $T > T_s > T/(X+1)$, where X is a degree of emphasis of the video signal referred in ratio to a non-emphasized level thereof.

2. A recording and reproducing device as set forth in claim 1, wherein said recording circuit comprises:
   a second high-pass filter having said time constant Ts;
   a second limiter for limiting an amplitude of an output signal of said second high-pass filter;
   a third coefficient multiplier circuit for multiplying an output signal of said second limiter by said first coefficient K;
   a third computation circuit for summing an output signal of said third coefficient multiplier circuit and said input video signal to deliver a signal indicative of the summed result to said second high-pass filter;
   a fourth coefficient multiplier circuit for multiplying an output signal of said second limiter by said second coefficient; and
   a fourth computation circuit for summing an output signal of said fourth coefficient multiplier circuit and said input video signal to output said recording video signal.

3. A recording and reproducing device as set forth in claim 2, wherein when said time constant Ts is set to a value expressed as $Ts = \{(K+1)/(X+1)\}T$, said first coefficient K is set to a range expressed below:

$$0 < K < X.$$

4. A recording and reproducing device as set forth in claim 2, wherein when said second coefficient is assumed as $(1-K)X$ and said time constant Ts is set to a value expressed as $Ts = \{1/(1-K)(X+1)\}T$, said first coefficient K is set to a range expressed below:

$$0 < K < \frac{X}{X+1}.$$

5. A recording and reproducing device as set forth in claim 2, wherein said second coefficient is assumed as X.

6. A recording and reproducing device as set forth in claim 1, wherein when said time constant Ts is set to a value expressed as $Ts=\{(K+1)/(X+1)\}T$, said first coefficient K is set to a range expressed below:

0<K<X.

7. A recording and reproducing device as set forth in claim 1, wherein when said second coefficient is assumed as (1−K)X and said time constant Ts is set to a value expressed as $Ts=\{1/(1-K)(X+1)\}T$, said first coefficient K is set to a range expressed below:

$$0 < K < \frac{X}{X+1}$$

8. A recording and reproducing device as set forth in claim 1, wherein said second coefficient is assumed as X.

9. A recording and reproducing device for a video signal comprising a recording circuit for changing an input video signal to generate a recording video signal, and a reproducing circuit for changing a reproduced video signal to generate an output video signal, said reproducing circuit comprising:
a first high-pass filter having a time constant Ts;
a first limiter for limiting an amplitude of an output signal of said first high-pass filter;
a first coefficient multiplier circuit for multiplying an output signal of the first limiter by a first coefficient K;
a first computation circuit for subtracting an output signal of said first coefficient multiplier circuit from said reproduced video signal to deliver a signal indicative of the subtracted result to said first high-pass filter;
a second coefficient multiplier circuit for multiplying an output signal of the first limiter by a second coefficient; and
a second computation circuit for subtracting an output signal of said second coefficient multiplier circuit from said reproduced video signal to output said output video signal, wherein when a time constant corresponding to a frequency at which the noise reduction effect becomes effective is assumed equal to T, said time constant Ts is set within a range T>Ts>T/(X+1), where X is a degree of emphasis of the video signal referred in ratio to a non-emphasized level thereof.

10. A recording and reproducing device as set forth in claim 9, wherein said recording circuit comprises:
a second high-pass filter having said second time constant Ts;
a second limiter for limiting an amplitude of an output signal of said second high-pass filter;
a third coefficient multiplier circuit for multiplying an output signal of said second limiter by said first coefficient K;
a third computation circuit for subtracting an output signal of said third coefficient multiplier circuit from said recording video signal to deliver a signal indicative of the subtracted result to said second high-pass filter;

a fourth coefficient multiplier circuit for multiplying an output signal of said second limiter by said second coefficient and
a fourth computation circuit for summing an output signal of said fourth coefficient multiplier circuit and said input video signal to output said recording video signal.

11. A recording and reproducing device as set forth in claim 10, wherein when said time constant Ts is set to a value expressed as $Ts=(1-K)T$, said first coefficient K is set to a range expressed below:

$$0 < K < \frac{X}{X+1}.$$

12. A recording and reproducing device as set forth in claim 10, wherein when said second coefficient is assumed as (1+K)X/(X+1) and said time constant Ts is set to a value expressed as $Ts=\{1/(1+K)\}T$, said first coefficient K is set to a value expressed below:

0<K<X.

13. A recording and reproducing device as set forth in claim 10, wherein said second coefficient is assumed as X/(X+1).

14. A recording and reproducing device as set forth in claim 7, wherein when said time constant Ts is set to a value expressed as $Ts=(1-K)T$, said first coefficient K is set to a range expressed below:

$$0 < K < \frac{X}{X+1}.$$

15. A recording and reproducing device as set forth in claim 9, wherein when said second coefficient is assumed as (1+K)X/(X+1) and said time constant Ts is set to a value expressed as $Ts=\{1/(1+K)\}T$, said first coefficient K. is set to a range expressed below:

0<K<X.

16. A recording and reproducing device as set forth in claim 9, wherein said second coefficient is assumed as X/(X+1).

17. A recording and reproducing device for a video signal comprising a recording circuit for changing an input video signal to generate a recording video signal, and a reproducing circuit for changing a reproduced video signal to generate an output video signal, said recording and reproducing circuit comprising:
a high-pass filter having a time constant Ts;
a first limiter for limiting an amplitude of an output signal of said high-pass filter;
a first coefficient multiplier circuit for multiplying an output signal of said first limiter by a first coefficient K;
a first computation circuit for summing an output signal of the first coefficient multiplier circuit and the output video signal to deliver a signal indicative of the summed result to said high-pass filter;
a second limiter for limiting an amplitude of said output signal of said high-pass filter;
a second coefficient multiplier circuit for multiplying an output signal of the second limiter by a second coefficient;
a second computation circuit for subtracting an output signal of said second coefficient multiplier circuit from said input video signal or said reproduced video signal to output said output video signal;

switching means inserted in a signal line between said second coefficient multiplier circuit and said second computation circuit wherein when said input video signal is changed to said recording video signal, said switching means allows said signal line to be cut off, and when said reproduced video signal is changed to said output video signal, said switching means allows said signal line to be conductive; and a third computation circuit for summing an output signal of said second coefficient multiplier circuit and said output video signal to output said recording video signal;

wherein when a time constant corresponding to a frequency at which the noise reduction effect becomes effective is assumed equal to T, said time constant Ts is set within a range $T > Ts > T/(X+1)$, where X is a degree of emphasis of the video signal referred in ratio to a non-emphasized level thereof.

18. A recording and reproducing device as set forth in claim 17, wherein when said time constant Ts is set to a value expressed as $Ts = \{(K+1)/(X+1)\}T$, said first coefficient K is set to a range expressed below:

$$0 < K < X.$$

19. A recording and reproducing device as set forth in claim 17, wherein said second coefficient is assumed as X.

* * * * *